C. W. HENKLE.
Corn-Planter.
No. 63,047.
Patented Mar. 19, 1867.
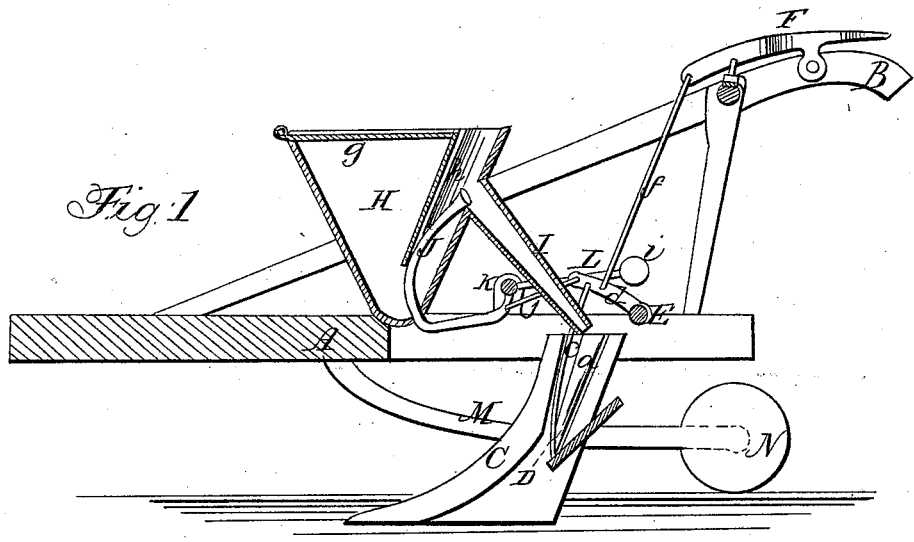
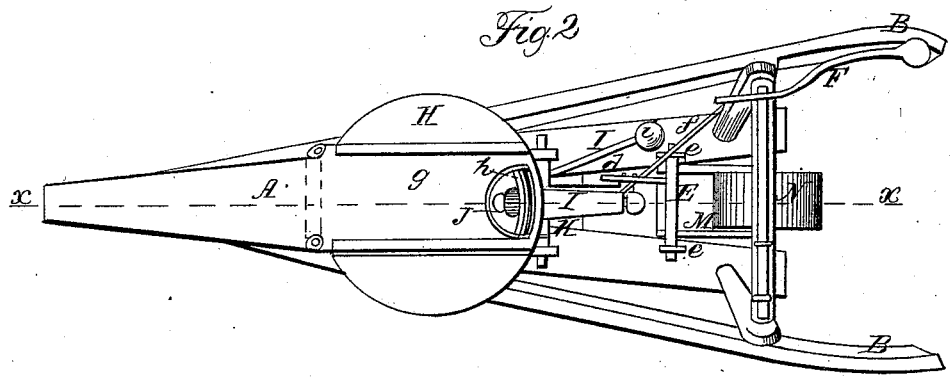
Witnesses,
Theo Tusche
Wm Truwn
Inventor;
C W Henkle

UNITED STATES PATENT OFFICE.

CURRAN W. HENKLE, OF WASHINGTON C. H., OHIO.

Letters Patent No. 63,047, dated March 19, 1867.

IMPROVEMENT IN CORN PLANTERS.

*The Schedule referred to in these Letters Patent and making part of the same.*

TO ALL WHOM IT MAY CONCERN:

Be it known that I, CURRAN W. HENKLE, of Washington C. H., in the county of Fayette, and State of Ohio, have invented a new and improved Corn Planter; and I do hereby declare that the following is a full, clear, and exact description thereof, which will enable others skilled in the art to make and use the same, reference being had to the accompanying drawings, forming part of this specification.

This invention relates to a new and improved means for distributing or discharging the seed from the seed-box or hopper of the machine, and depositing the same in the furrow, as hereinafter fully shown and described, whereby the planting or dropping of the seed is placed under the complete control of the operator, and a very simple and efficient device for the purpose specified obtained. In the accompanying drawings—

Figure 1 is a side sectional view of my invention, taken in the line $x$ $x$, fig. 2.

Figure 2, a plan or top view of the same.

Similar letters of reference indicate like parts.

A represents the frame of the implement, to which the handles B B are attached, and a plough or furrow opener, C, the latter having an opening, $a$, in it to conduct the seed down into the furrow made by the plough, (see fig. 1.) In the rear of the plough there is fitted obliquely a fixed strip, $b$, against the inner part of which a sliding valve, D, works, said valve being connected by a rod, $c$, with an arm, $d$, projecting from a shaft, E, the bearings $e$ of which are on the frame A. This arm $d$ is also connected by a rod, $f$, with a lever, F, attached to the right-hand handle of the device within convenient reach of the thumb of the right hand of the operator. H is a seed-hopper secured to the frame A. This hopper is of funnel form, is provided with a sliding or other lid, $g$, and has a tube, $h$, attached to its inner side and extending from the top to within a short distance of the bottom of the hopper, as shown clearly in fig. 1. I is a spout extending from the tube $h$, down over the opening $a$ in the plough C, and J is a curved arm, having a cup-shaped extremity, and attached to a shaft, K, on the frame A, and passing up through an opening in the lower part of the hopper, said arm J having such a curvature that it may work up in tube $h$, and when fully up extend to the orifice of spout I, as shown in fig. 1. The shaft K also has an arm, L, projecting from its rear side, with a weight, $i$, upon it, which weight has a tendency to keep the arm J upward to its fullest extent, and also to keep the valve D closed up against the fixed strip, $b$, owing to the end of the arm $d$ being connected to a curve in the arm J, below its shaft E, by a rod, $j$. M is a bar the front end of which is attached to the under side of the frame A. This bar is bifurcated or forked at its rear part, in the fork of which the plough C is fitted, a roller, N, being in the fork of said bar just behind the plough.

The operation is as follows: As the implement or device is drawn along the plough C opens the furrow, and the operator, by depressing the outer end of lever F, raises the arm $d$, and thereby lowers the curved arm J so that the upper end of it will be below the lower end of the tube $h$, and allow the corn to pass over the upper end of J. On releasing the lever F the loaded arm L will throw up the curved arm J, and discharge the corn into spout I, which conducts it into opening $a$, where it is retained by the valve D until the operator again depresses the outer end of lever F, when the valve is raised and the corn dropped into the furrow. By this arrangement it will be seen that the corn is discharged from the interior of the plough near the surface of the ground, and hence may be dropped at the precise spot required, the dropping of the corn occurring each time the curved arm J is depressed or forced down in order to raise or force up a succeeding dropping into spout I. The roller N covers the corn in the furrow and compacts the earth upon the corn. The device is extremely simple and efficient, is under the complete control of the operator, and may be manipulated with the greatest facility.

Having thus described my invention, I claim as new, and desire to secure by Letters Patent—

1. The curved arm J, operated through the medium of the loaded arm L, and lever F, in combination with the hopper H, provided with the tube $h$ and the spout I, all arranged to operate in the manner substantially as and for the purpose set forth.

2. The valve D, in the opening $a$ in the plough C, when arranged to operate in connection with the curved arm J substantially in the manner as and for the purpose specified.

CURRAN W. HENKLE.

Witnesses:
JOHN CISSNA,
MILTON HYER.